United States Patent
Griffin et al.

(10) Patent No.: US 9,950,321 B2
(45) Date of Patent: Apr. 24, 2018

(54) DEVICE FOR SEPARATION AND COLLECTION OF PLASMA

(71) Applicant: General Electric Company, Schenectady, NY (US)

(72) Inventors: Weston Blaine Griffin, Niskayuna, NY (US); Erin Jean Finehout, Clifton Park, NY (US); Ying Mao, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 427 days.

(21) Appl. No.: 14/450,585

(22) Filed: Aug. 4, 2014

(65) Prior Publication Data

US 2016/0030895 A1 Feb. 4, 2016

(51) Int. Cl.
*B01L 3/00* (2006.01)
*B01D 63/08* (2006.01)
*B01D 61/18* (2006.01)

(52) U.S. Cl.
CPC ............ *B01L 3/5023* (2013.01); *B01D 61/18* (2013.01); *B01D 63/087* (2013.01); *B01L 2200/026* (2013.01); *B01L 2300/0609* (2013.01); *B01L 2300/069* (2013.01); *B01L 2300/0681* (2013.01); *B01L 2300/0816* (2013.01)

(58) Field of Classification Search
CPC ............ B01L 3/5023; B01L 2200/026; B01L 2300/0609; B01L 2300/0816; B01L 2300/0681; B01L 2300/069; B01D 61/18; B01D 63/087
See application file for complete search history.

(56) References Cited

U.S. PATENT DOCUMENTS

| 4,066,512 A * | 1/1978 | Lai ................ B01D 69/144 435/10 |
| 5,133,730 A | 7/1992 | Biro et al. |
| 5,518,006 A | 5/1996 | Mawhirt et al. |
| 5,560,830 A | 10/1996 | Coleman et al. |
| 5,876,926 A | 3/1999 | Beecham |

(Continued)

FOREIGN PATENT DOCUMENTS

| EP | 2375249 A2 | 10/2011 |
| GB | 2151943 A | 7/1985 |

(Continued)

OTHER PUBLICATIONS

Nabatiyan et al., "Membrane-based plasma collection device for point-of-care diagnosis of HIV", Journal of Virological Methods, vol. 173, pp. 37-42, 2011.

(Continued)

*Primary Examiner* — Krishnan S Menon
*Assistant Examiner* — Waqaas Ali
(74) *Attorney, Agent, or Firm* — Rong Zhang (57) ABSTRACT

A substrate for positioning a separation membrane and a collection membrane for separating and collecting plasma is disclosed. The substrate includes an inner flexure disposed proximate to a first peripheral portion of the substrate and an outer flexure disposed surrounding at least a portion of the inner flexure. The inner flexure is formed from a plurality of first slots in the substrate and the outer flexure is formed from a plurality of second slots in the substrate.

16 Claims, 5 Drawing Sheets

(56) References Cited

U.S. PATENT DOCUMENTS

| | | | |
|---|---|---|---|
| 5,893,870 | A | 4/1999 | Talen et al. |
| 5,916,521 | A * | 6/1999 | Bunce ................ G01N 33/5002 422/422 |
| 7,744,820 | B2 | 6/2010 | Togawa et al. |
| 7,794,720 | B2 | 9/2010 | Wilson |
| 2009/0198152 | A1 | 8/2009 | Kim |
| 2012/0024788 | A1 | 2/2012 | Kelso et al. |
| 2012/0220047 | A1 | 8/2012 | Seifried et al. |
| 2013/0334139 | A1 | 12/2013 | Blickhan et al. |
| 2015/0031035 | A1 | 1/2015 | Kvam et al. |

FOREIGN PATENT DOCUMENTS

| | | | | |
|---|---|---|---|---|
| GB | 2481221 A | * | 12/2011 | ................ B42F 1/06 |
| KR | 102007005395 A | * | 5/2007 | ................ B42F 1/06 |
| WO | 2004033101 A1 | | 4/2004 | |
| WO | 2007068811 A1 | | 6/2007 | |
| WO | 2014018903 A1 | | 1/2014 | |
| WO | 2014023756 A1 | | 2/2014 | |
| WO | 2015086261 A1 | | 6/2015 | |

OTHER PUBLICATIONS

Hartford, "A Preanalytic Blood Separation and Metering System for Qualitative and Quantitative Lateral Flow Biosensors", Posted in IVD by Jamie Hartford on Jun. 6, 2013, downloaded from "http://www.mddionline.com/article/preanalytic-blood-separation-and-metering-system-qualitative-and-quantitative-lateral-flow-b?_sm_au_=iMVRH1v2DR0sV13s" downloaded on Aug. 8, 2014 Jun. 6, 2013, 8 Pages.

Mezitis et al., "Self-Monitoring of Blood Glucose: Tourniquet Method", Diabetes Care, vol. No. 10, Issue No. 6, pp. 793-794, Nov.-Dec. 1987.

Hosono et al., "Unbiased Whole-Genome Amplification Directly From Clinical Samples", Genome Research, vol. No. 13, Issue No. 5., pp. 954-964, May 2003.

Wu et al., "A Simple Method to Elute Cell-Free HIV from Dried Blood Spots Improves their Usefulness for Monitoring Therapy", Journal of Clinical Virology vol. No. 65, pp. 38-40, Apr. 2015.

PCT Search Report and Written Opinion issued in connection with corresponding Application No. PCT/EP2015/067888 dated Oct. 26, 2015.

Erik Leeming Kvam et al., May 14, 2015, U.S. Appl. No. 14/712,290.

* cited by examiner

DEVICE FOR SEPARATION AND COLLECTION OF PLASMA

BACKGROUND

The present invention relates to a medical device and consumables, and more particularly to a device used for separating and collecting plasma from blood samples.

Typically, membranes are used in separation and collection of plasma from blood samples. In one method, a single membrane is used for the separation and collection of plasma. In such method, during operation of medical consumables the blood samples may be applied to one end of the membrane and as the blood sample flows through, blood cells may be separated from the plasma based on the size of the membranes pores. After operation of the medical consumables, the plasma containing portion of the membrane may be severed from the blood cells containing portion of the membrane and thereby necessitating an additional step of severing the membranes. Further, the single membrane approach may prevent using different materials and/or chemistries in the membranes for the separation and collection of plasma.

In another method, two separate membranes are used for the separation and collection of plasma. Specifically, a first membrane for the separation of blood cells and a second membrane for the collection of plasma. These membranes may be arranged such that a distal end of the first membrane contacts a proximal end of the second membrane to facilitate the separation of blood cells via the first membrane and the collection of plasma via the second membrane.

Typically, devices for holding two membranes end-to-end with a minimal but reproducible, overlap require a superior manufacturing tolerance that may not be compatible with low-cost manufacturing methods such as injection molding. Also, it may be difficult to apply uniform pressure at a contact area of the membranes to ensure consistent transfer of plasma from the separation membrane to the collection membrane without damaging the membranes.

Thus, there is a need for an improved device or consumable for facilitating proper holding and accurate positioning of two membranes used in plasma separation and collection.

BRIEF DESCRIPTION

In one embodiment, the present invention provides a substrate for positioning a separation membrane and a collection membrane for separating and collecting plasma. The substrate includes an inner flexure disposed proximate to a first peripheral portion of the substrate. The inner flexure is formed from a plurality of first slots in the substrate. The substrate further includes an outer flexure disposed surrounding at least a portion of the plurality of first slots. The outer flexure is formed from a plurality of second slots in the substrate.

In another embodiment, the present invention provides a device for separating and collecting plasma. The device includes a separation membrane, a collection membrane, and a substrate. The substrate includes an inner flexure disposed proximate to a first peripheral portion of the substrate. The inner flexure is formed from a plurality of first slots in the substrate. The substrate further includes an outer flexure disposed surrounding at least a portion of the plurality of first slots. The outer flexure is formed from a plurality of second slots in the substrate. A distal end of the separation membrane is disposed under the outer flexure, and a proximal end of the collection membrane is disposed under at least one of the outer flexure and inner flexure such that the proximal end of the collection membrane has an overlapping contact area with the distal end of the separation membrane. Further, the outer flexure is configured to apply pressure on the separation and collection membranes about the overlapping contact area.

In yet another embodiment, the present invention provides a method of assembling a device for separating and collecting plasma. The method includes the step of displacing, such as by pressing downwards, an inner flexure of a substrate to insert a distal end of a separation membrane under an outer flexure of the substrate via a first mid-slot of the inner flexure. The method further includes the step of displacing the outer and inner flexures, for example by applying pressure by pushing upwards, to insert a proximal end of a collection membrane under at least one of the outer and the inner flexures via a second mid-slot of the outer flexure, such that the proximal end of the collection membrane has an overlapping contact area with the distal end of the separation membrane. Further, the method includes the step of releasing the outer and inner flexures from a displaced position to an initial rest position to apply pressure on the separation and collection membranes about the overlapping contact area. The inner flexure is formed from a plurality of first slots including a plurality of first sub-slots and a first mid-slot. The outer flexure is formed from a plurality of second slots including a plurality of second sub-slots and the second mid-slot. The plurality of first sub-slots is proximate to a first peripheral portion of the substrate and the first mid-slot is located at a distal end portion of the inner flexure and connected to a distal end of each first sub-slot. The plurality of second sub-slots surrounds at least a portion of the plurality first sub-slots and the second mid-slot is proximate to the first mid-slot and connected to a distal end of each second sub-slot.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Embodiments discussed herein disclose a new device for facilitating plasma separation and collection from blood samples. The device of the present invention includes one piece substrate having an outer flexure and an inner flexure, a separation membrane, and a collection membrane. The inner flexure is formed from a plurality of first slots and the outer flexure is formed from a plurality of second slots. The inner flexure is configured to align a distal end of the separation membrane under a distal end portion of the outer flexure. The outer and inner flexures are further configured to align a proximal end of the collection membrane under the distal end portion of the outer flexure and a distal end portion of the inner flexure such that the proximal end of the collection membrane has a defined overlapping contact area with the distal end of the separation membrane. The overlapping contact area between the two membranes within the substrate facilitates proper separation and collection of plasma from the blood samples.

Figure 1:
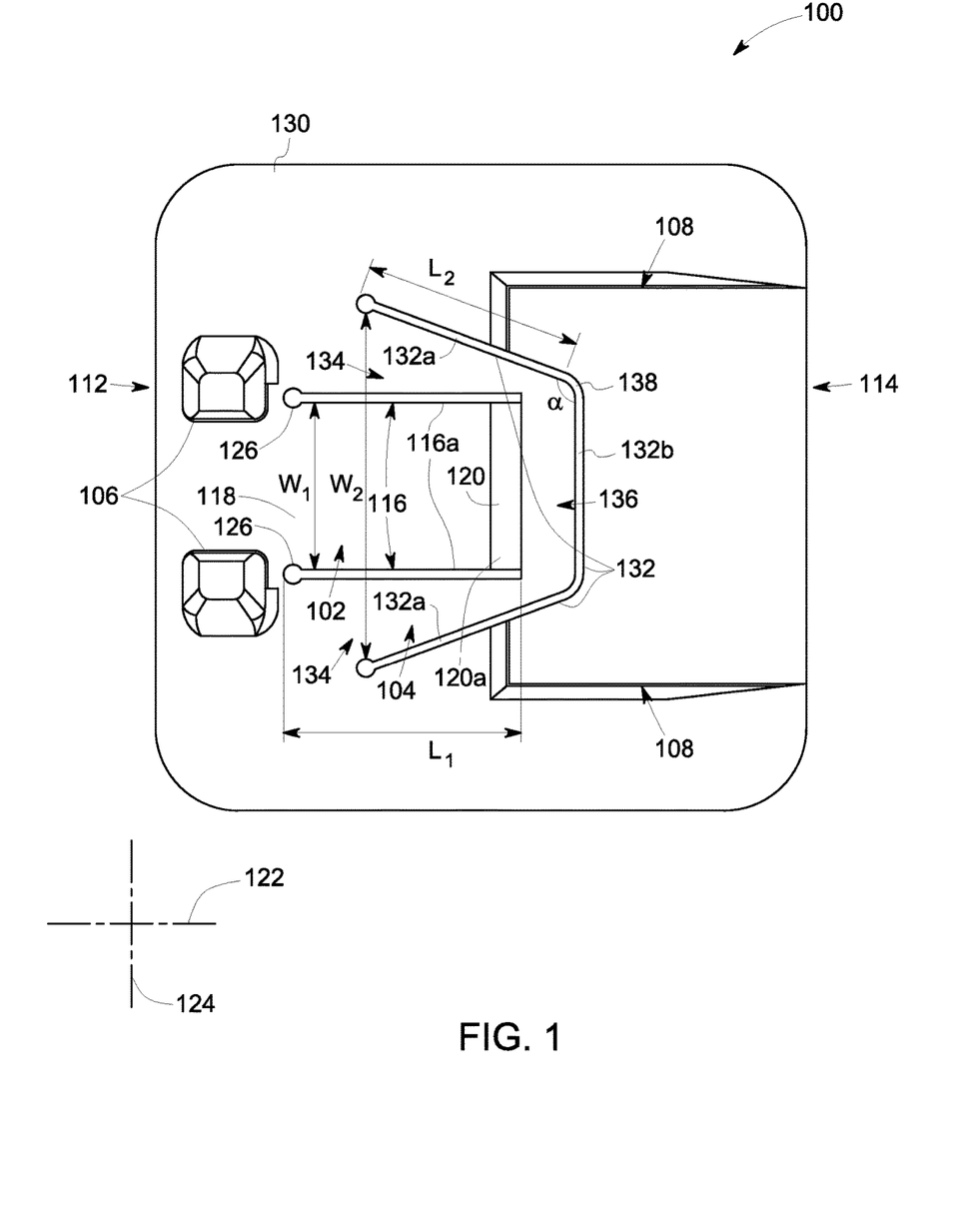
FIG. 1 illustrates a top view of a substrate in accordance with one exemplary embodiment.
Figure 2:
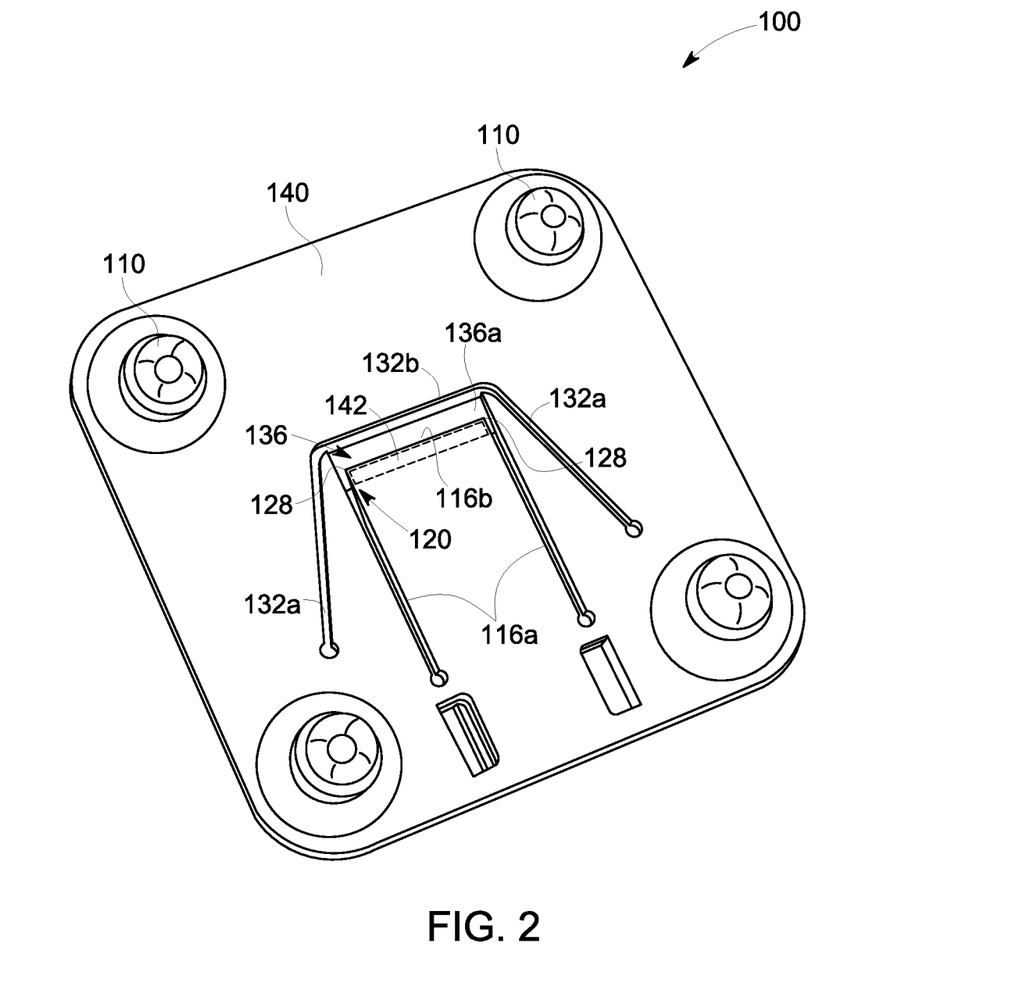
FIG. 2 illustrates a bottom view of a substrate in accordance with one exemplary embodiment.

FIG. 1 represents a top view of a substrate 100 in accordance with one exemplary embodiment of the present invention. The substrate 100 includes an inner flexure 102 and an outer flexure 104. The substrate 100 further includes a plurality of holding mechanism 106, a plurality of guiding mechanism 108, and a plurality of fixtures 110 (as shown in FIG. 2).

Figure 3:
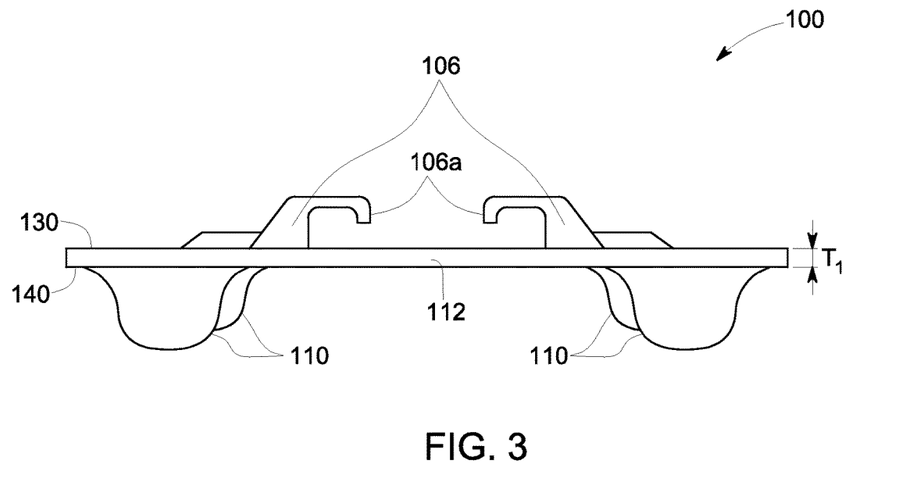
FIG. 3 illustrates a side view of a substrate in accordance with one exemplary embodiment.

The substrate 100 is a base member configured to receive, hold, support, and align at least two membranes used in separation and collection of plasma from blood samples. In one embodiment, the substrate 100 has a square shape with curved edges and includes a first peripheral portion 112 and a second peripheral portion 114 disposed opposite to the first peripheral portion 112. The substrate 100 has a polymer material such as polypropylene, nylon (polyamide), high density polyethylene (HDPE), and polyetheretherketone (PEEK). In one embodiment, the substrate 100 of the present invention may be manufactured using an injection molding technique and has a uniform thickness "$T_1$" (as shown in FIG. 3) with minimal tolerance to align the two membranes. In certain other embodiments, the substrate 100 may have different shape such as circular, oval, rectangle, and the like. Similarly, the substrate 100 may have varied thickness "$T_1$" depending on the application and design criteria.

In one embodiment, the inner flexure 102 is located proximate to the first peripheral portion 112 and formed from a plurality of first slots 116 in the substrate 100. Specifically, the inner flexure 102 is defined by a portion of the substrate 100 bounded by the plurality of first slots 116. The plurality of first slots 116 includes a plurality of first sub-slots 116a and a first mid-slot 116b (as shown in FIG. 2). The first mid-slot 116b is located at a first distal end portion 120 of the inner flexure 102 and connected to a distal end 128 (as shown in FIG. 2) of each first sub-slot 116a. A proximal end 126 of the plurality of first sub-slots 116a is proximate to the first peripheral portion 112. In one embodiment, the plurality of first sub-slots extends along a pre-determined angle relative to the first mid-slot 116b and the first mid-slot 116b extends along a transverse direction 124. In one embodiment, the pre-determined angle is about 90 degrees. In certain other embodiments, the plurality of first sub-slot 116a may extend along a longitudinal direction 122 and are parallel to each other.

The inner flexure 102 has geometry of a beaker turned on its one side, and has a thickness equal to the thickness "$T_1$" of the substrate 100. The geometry of the inner flexure 102 varies based on a length "$L_1$" of the plurality of first slots 116 and a width "$W_1$" of the inner flexure 102. Similarly, the thickness of the inner flexure 102 may vary depending on the application and design criteria. The inner flexure 102 has a first stiffness "$S_1$" depending on the geometry and thickness of the inner flexure 102. The stiffness "$S_1$" may be controlled by either increasing or decreasing the width "$W_1$", length "$L_1$", and thickness of the inner flexure 102. In one exemplary embodiment, the inner flexure 102 has a relatively longer length "$L_1$", a relatively narrow width "$W_1$", and thickness "$T_1$" of the substrate 100 to obtain a substantially lesser stiffness "$S_1$" in comparison with a stiffness of the outer flexure 104. In another embodiment, the inner flexure 102 may have a relatively longer length "$L_1$", a relatively narrow width "$W_1$", and a relatively thinner thickness in comparison with the thickness "$T_1$" of the substrate 100 to obtain a substantially lesser stiffness "$S_1$" in comparison with a stiffness of the outer flexure 104.

In the illustrated embodiment, the first distal end portion 120 has a first tapered portion 120a. The first tapered portion 120a is formed on a top surface 130 of the substrate 100 corresponding to the first distal end portion 120. The first tapered portion 120a is configured to allow smooth bending of membranes (not shown in FIG. 1) along the first mid-slot 116b. In certain other embodiments, the first distal end portion 120 may have a first rounded portion having an arc shaped profile to allow smooth bending of membranes along the first mid-slot 116b. The first distal end portion 120 may have different profile depending on the application and design criteria.

In one embodiment, the outer flexure 104 is located surrounding a portion of the plurality of first slots 116 and formed from a plurality of second slots 132 in the substrate 100. Specifically, the outer flexure 104 is defined by another portion of the substrate 100 bounded between the plurality of first slots 116 and the plurality of second slots 132. The outer flexure 104 has a second proximal end portion 134 and a second distal end portion 136. In the illustrated embodiment, the outer flexure 104 has a trapezoidal geometry and has a thickness equal to the thickness "$T_1$" of the substrate 100. The geometry of the outer flexure 104 may vary based on a length "$L_2$" of the plurality of second slots 132 and a width "$W_2$" of the outer flexure 104. Similarly, the thickness of the outer flexure 104 may vary depending on the application and design criteria.

The plurality of second slots 132 includes a plurality of second sub-slots 132a and a second mid-slot 132b. The plurality of second sub-slots 132a surrounds a portion of the plurality first sub-slots 116a and the second mid-slot 132b is located near the first mid-slot 116b. Further, the second mid-slot 132b is connected to a distal end 138 of each second sub-slot 132a. In the illustrated embodiment, the second mid-slot 132b extends along the transverse direction 124 and each second sub-slot 132a extends at a predetermined angle "$\alpha$" relative to the second mid-slot 132b. In one embodiment, the pre-determined angle "$\alpha$" is greater than or equal to 90 degrees. In certain other embodiments, each second sub-slot 132a may extend in the longitudinal direction 122 and in such embodiments the plurality of second sub-slots 132a may be parallel to each other.

The outer flexure 104 has a second stiffness "$S_2$" depending on the geometry and thickness of the outer flexure 104. In one embodiment, the first stiffness "$S_1$" is lesser than the second stiffness "$S_2$". The stiffness "$S_1$" and "$S_2$" may change depending on the geometry and thickness of the respective flexures 102, 104. The stiffness "$S_2$" may be controlled by either increasing or decreasing the width "$W_2$", length "$L_2$", and thickness of the outer flexure 104. Specifically, the width "$W_2$" may be controlled by varying the pre-determined angle "$\alpha$" and may be controlled by varying the length of the second mid-slot 132b. In one exemplary embodiment, the outer flexure 104 has a wider width "$W_2$", a shorter length "$L_2$", and similar thickness to obtain a substantially greater stiffness "$S_2$" in comparison with the stiffness "$S_1$" of the inner flexure 102. For example, the stiffness "$S_1$" being less than "$S_2$" may be a measure by stiffness in the flexures as determined by the degree of deflection when a load is applied to the substrate at the respective mid-slots 116b, 132b by the inner and outer flexures 102, 104.

In the illustrated embodiment, the second distal end portion 136 has a second tapered portion 136a (as shown in FIG. 2). The second tapered portion 136a is formed on a bottom surface 140 (as shown in FIG. 2) of the substrate 100 corresponding to the second distal end portion 136. The second tapered portion 136a is configured to reduce bending of the membranes (not shown in FIG. 1) along the second mid-slot 132b. In certain other embodiments, the second distal end portion 136 may have a second rounded portion having an arc shaped profile to allow smooth bending of membranes along the second mid-slot 132b. The second distal end portion 136 may have different profile depending on the application and design criteria.

The plurality of holding mechanism 106 is disposed on the top surface 130. Specifically, the holding mechanism 106 is located between the first peripheral portion 112 and the first proximal end portion 118. In the illustrated embodiment, the holding mechanism 106 is a clip having an arch shaped design. In certain other embodiments, the holding mechanism 106 may be hooks, clasps, adhesives, and the like. The holding mechanism 106 may be configured to hold and align a separation membrane (not shown in FIG. 1) to position along the inner flexure 102 and beneath the outer flexure 104. Further, the clip of the holding mechanism 106 may prevent the separation membrane 152 being cantilevered at the proximal end 156.

The plurality of guiding mechanism 108 is disposed on the top surface 130. Specifically, the guiding mechanism 108 is located surrounding a portion of the plurality of second slots 132 and proximate to the second peripheral portion 114. In the illustrated embodiment, the guiding mechanism 108 is a ridge having protrusion. In certain other embodiments, the guiding mechanism 108 may be printed lines, grooves, and the like. The guiding mechanism 108 may be configured to support and guide a collection membrane (not shown in FIG. 1) to position beneath the outer flexure 104. The guiding mechanism 108 may also be configured to limit any motion of the separation membrane when the membrane is wetted.

The plurality of fixtures 110 is disposed on the bottom surface 140 so as to ensure a gap between the substrate 100 and a surface (not shown) upon which the substrate is placed. Specifically, the plurality of fixtures 110 is located at all corners of the substrate 100. In the illustrated embodiment, the fixture 110 is a circular support structure. In certain other embodiments, the fixture 110 may be wedges, blocks, and the like. The fixture 110 may be configured to support the substrate 100 over any surface.

FIG. 2 represents a bottom view of the substrate 100 in accordance with the exemplary embodiment of FIG. 1. In the illustrated embodiment, the outer flexure 104 includes the second distal end portion 136 overlapping with a fraction 142 of the first distal end portion 120 of the inner flexure 102. In one embodiment, the first tapered portion 120a and the second tapered portion 136a typically forms a skive cut (i.e. an angled cut or an angled slot) between the inner flexure 102 and the outer flexure. The first tapered portion 120a (as shown in FIG. 1) and the second tapered portion 136a have a complementary profile so as to reduce bending of the membranes (not shown in FIG. 2) along the skive cut via the mid slots 116b, 132b. In another embodiment, the first curved portion and second curved portion may have a complementary profile. In certain other embodiments, the second distal end portion 136 may not have overlapping fraction 142 with the first distal end portion 120. In such embodiments, a contact area (not shown in FIG. 2) of the membranes may be defined by a width of the distal end portion 136 and a width of the mid-slot 116b of the outer flexure 104. Further, the stiffness "$S_1$", $S_2$" of the flexures 102, 104 may be adjusted based on a thickness of the membranes.

FIG. 3 represents a side view of the substrate 100 in accordance with the exemplary embodiments of FIGS. 1 and 2. In the illustrated embodiment, the substrate 100 includes the plurality of holding mechanism 106 is an arch shaped clip 106a disposed proximate to the first peripheral portion 112 and on the top surface 130 of the substrate 100. The plurality of fixtures 110 is disposed at all corners and on the bottom surface 140 of the substrate 100. Further, the substrate 100 has the uniform thickness "$T_1$".

Figure 4:
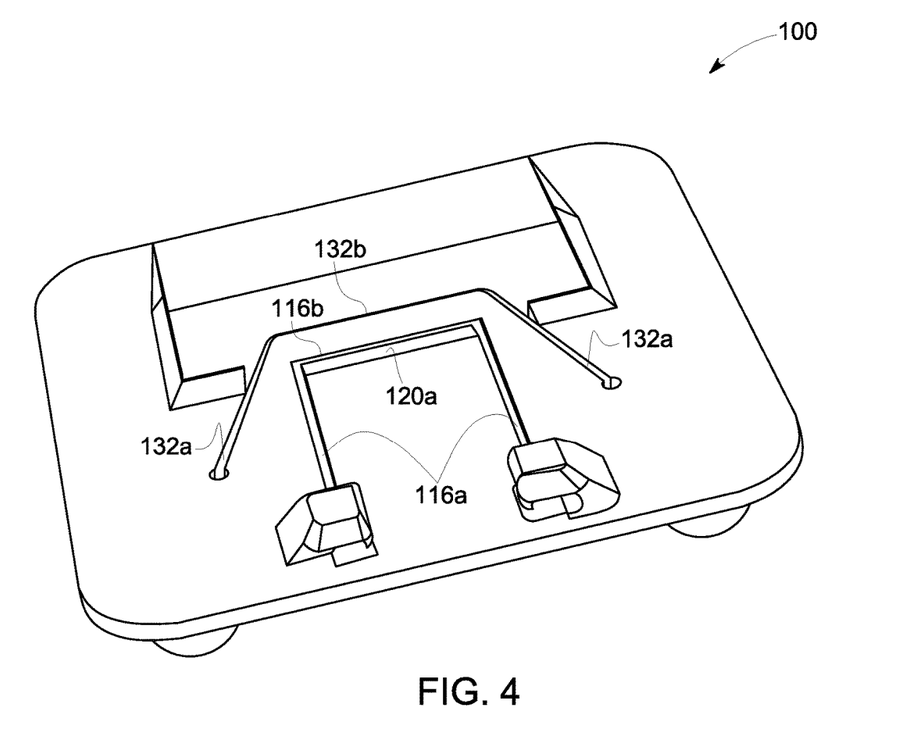
FIG. 4 represents a perspective top view of a substrate in accordance with the exemplary embodiments of FIGS. 1, 2, and 3.

FIG. 4 represents a perspective top view of the substrate 100 in accordance with the exemplary embodiments of FIGS. 1, 2, and 3. In the illustrated embodiment, the inner flexure 102 includes the plurality of first sub-slots 116a and the first mid-slot 116b. The first distal end portion 120 of the inner flexure 102 includes the first tapered portion 120a. The outer flexure 104 includes the plurality of second sub-slots 132a and the second mid-slot 132b.

Figure 5:
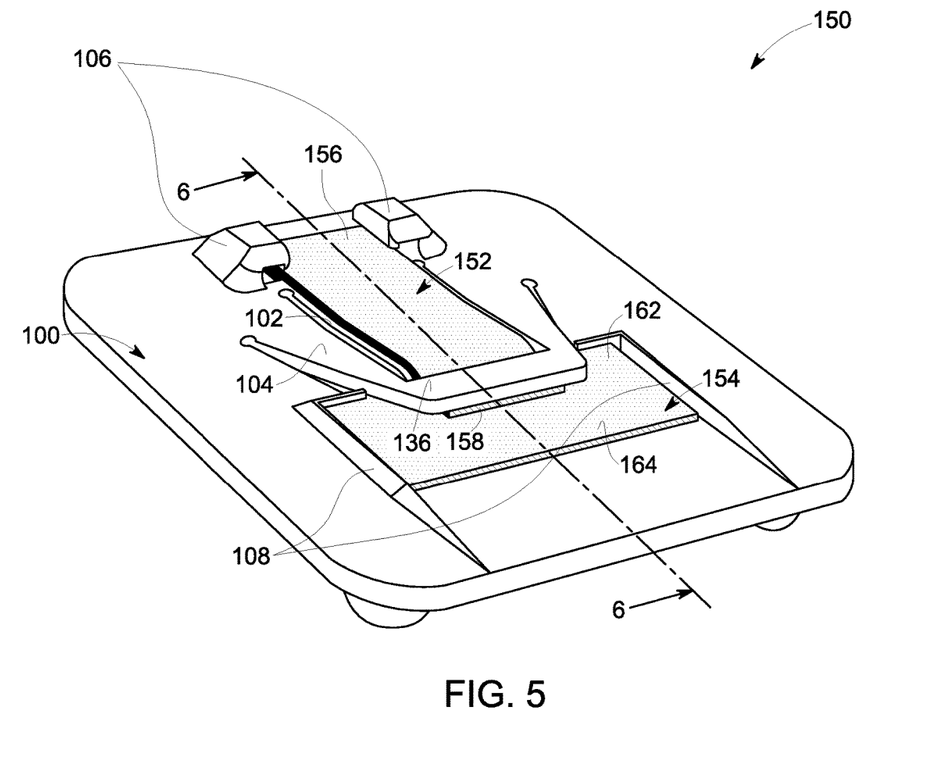
FIG. 5 represents a perspective top view of a device having the substrate in accordance with the exemplary embodiment of FIG. 4.

FIG. 5 represents a perspective top view of a device 150 in accordance with the exemplary embodiment of FIG. 4. The device 150 includes the substrate 100, a separation membrane 152, and a collection membrane 154. The device 150 may be configured to receive the blood samples obtained via a finger prick or a heel prick for separation and collection of plasma. The device 150 may be configured for a horizontal blood flow or a vertical blood flow.

In one embodiment, the separation membrane 152 is a membrane, configured to remove cells from the blood samples. The separation membrane 152 may include suitable materials such as cellulose, a glass fiber, a cellulose acetate, a poly vinyl pyrrolidone, a polysulfone, a polyethersulfone, a polyester or combinations of these materials. The separation membrane 152 may be designed to have a geometry compatible with the geometry of the substrate 100, specifically, the geometry of the inner flexure 102 of the substrate 100. In the illustrated embodiment, the separation membrane 152 is of rectangular shape and includes a proximal end 156 and a distal end 158. The separation membrane 152 is disposed over the inner flexure 102. The distal end 158 is disposed under the outer flexure 104 and the proximal end 156 is disposed beneath the plurality of the holding mechanism 106. The holding mechanism 106 having the arch shaped clip 106a may hold the separation membrane 152 by maintaining a wider gap between the separation membrane 152 and the substrate 100 or the inner flexure 102. Thus, the holding mechanism 106 having the arch shaped clip 106a may avoid the blood samples to spread on the device 150 or the substrate 100 or the holding mechanism 106 from the separation membrane 152 due to surface tension and/or capillary force induced typically in the gap.

Figure 6:
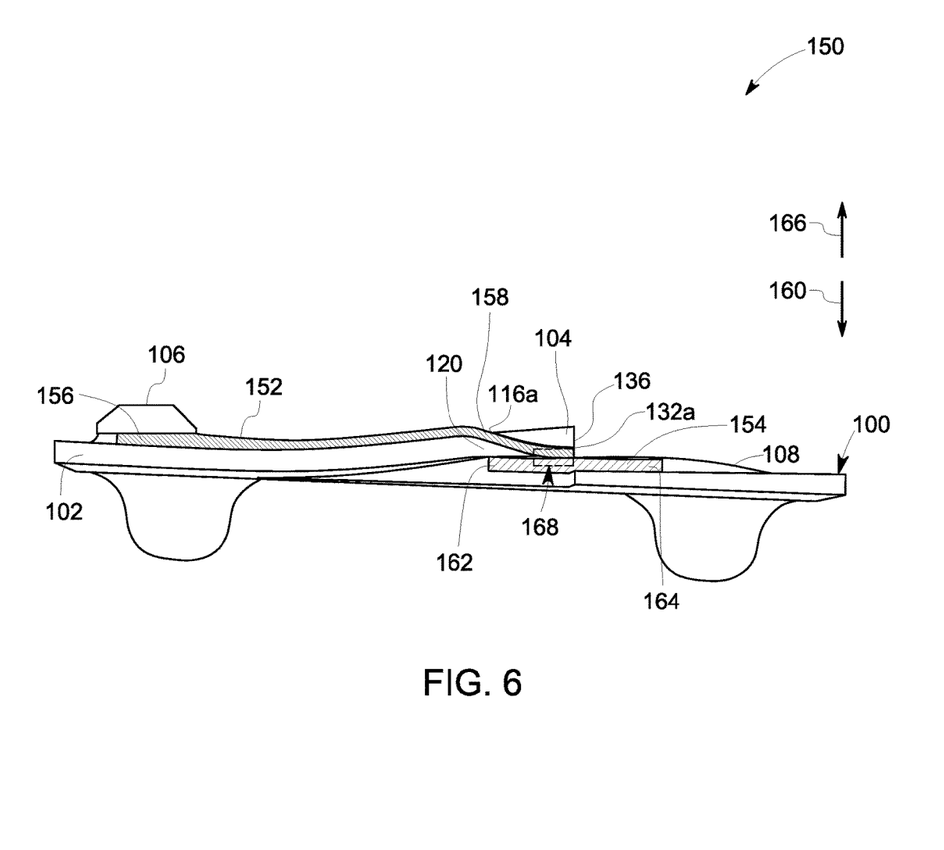
FIG. 6 represents a sectional side view of the device in accordance with the exemplary embodiment of FIG. 5.

In one embodiment, the collection membrane 154 is a chemically treated membrane, configured to enhance stability of components e.g. plasma, in the blood samples. The collection membrane 154 may include suitable materials such as cellulose, a glass fiber, a cellulose acetate, a poly vinyl pyrrolidone, a polysulfone, a polyethersulfone, polyester, or combinations of these materials. In the illustrated embodiment, the collection membrane 154 is of rectangular shape and includes a proximal end 162 and a distal end 164. The collection membrane 154 is disposed under the outer flexure 104 and inner flexure 102. Specifically, the proximal end 162 is disposed under the second distal end portion 136, the first distal end portion 120 (as shown in FIG. 4), and the distal end 158 of the separation membrane 154, and the distal end 164 is disposed along the plurality of the guiding mechanism 108. Upon positioning the membranes 152, 154 on the substrate 100, an overlapping contact area 168 (as shown in FIG. 6) is formed between the proximal end 162 of the collection membrane 154 and the distal end 158 of the separation membrane 152. In one embodiment, the overlapping contact distance in the longitudinal direction 122 is in a range from about 1 mm to about 2 mm. The separation membrane 152 is about 8 mm wide in the transverse direction. The overlapping contact area 168 is defined by the overlapping contact distance and the width of the separation membrane 152 and is in the range from about 8 mm² to about 16 mm². The outer flexure 104 having the stiffness "$S_2$" is configured to apply pressure on membranes 152, 154 about the overlapping contact area 168 and hold the membranes 152, 154 together at their respective ends 158, 162.

FIG. 6 represents a sectional side view along an axis 6-6 of the device 150 in accordance with the exemplary embodiment of FIG. 5.

The separation membrane 152 is introduced along the inner flexure 102 via the plurality of holding mechanism 106, which is configured to hold and align the separation membrane 152 to position along the inner flexure 102. Further, the inner flexure 102 is displaced, or pressed in a first direction 160, (e.g. downward direction) such that the distal end 158 of the separation membrane 152 may be inserted beneath the second distal end portion 136 of the outer flexure 104 via the first mid-slot 116b of the inner flexure 102.

The collection membrane 154 is placed along the plurality of guiding mechanism 108, which is configured to support the collection membrane 154 to position towards the outer flexure 104. Further, the outer flexure 104 and inner flexure 102 is displaced or pushed in a second direction 166, (e.g. upward direction) such that the proximal end 162 of the collection membrane 154 may be inserted beneath the second distal end portion 136 via the second mid-slot 132b, and the first distal end portion 120. The proximal end 162 of the collection membrane 154 has the overlapping contact area 168 with the distal end 158 of the separation membrane 152. The outer flexure 104 and inner flexure 102 is released from the pushed position to an initial rest position so as to apply pressure on the separation membrane 152 and collection membrane 154 about the overlapping contact area 168. In the illustrated embodiment, the inner flexure 102 and outer flexure 104 apply uniform pressure in the transverse direction 124 across the distal end 158 of the separation membrane 152 and proximate to the proximal end 162 of the collection membrane 154 to facilitate proper plasma separation and collection from the blood samples.

During usage of the device 150, the blood samples (not shown in FIG. 6) may be applied on the proximal end 156 of the separation membrane 152. The blood samples may flow in the longitudinal direction 122 along the separation membrane 152 where the blood cells are retained. The blood samples may reach the overlapping contact area 168 where the plasma in the blood samples is transferred from the separation membrane 152 into the collection membrane 154. Later, the plasma is stabilized as it moves along the collection membrane 154.

In accordance with embodiments discussed herein, a single piece substrate facilitates accurate positioning of the membranes. The substrate with flexures design and homogenous material provides uniform pressure at an overlapping contact area of the membranes. The arc shaped clips avoids damaging the membranes. Due to less tolerance requirement, the substrate may be easy to use and manufacture.

While only certain features of embodiments have been illustrated and described herein, many modifications and changes will occur to those skilled in the art. It is, therefore, to be understood that the appended claims are intended to cover all such modifications and changes as falling within the spirit of the invention.

The invention claimed is:

1. A substrate for positioning a separation membrane and a collection membrane for separating and collecting plasma, the substrate comprising:
   an inner flexure defined by a plurality of first slots in the substrate, disposed proximate to a first peripheral portion of the substrate; and
   an outer flexure defined by a plurality of second slots in the substrate, disposed surrounding at least a portion of the plurality of first slots,
   wherein the inner flexure comprises a first distal end portion and the outer flexure comprises a second distal end portion adjacently overlapping with a fraction of the first distal end portion of the inner flexure, and means for holding and aligning the separation membrane to position along the inner flexure, said means located between the first peripheral portion and a first proximal end portion of the inner flexure.

2. The substrate of claim 1, wherein the first distal end portion comprises a first tapered portion and the second distal end portion comprises a second tapered portion.

3. The substrate of claim 2, wherein the first tapered portion and second tapered portion have a complementary profile.

4. The substrate of claim 1, wherein the plurality of first slots comprises a plurality of first sub-slots and a first mid-slot, wherein the plurality of first sub-slots is proximate to the first peripheral portion and the first mid-slot is located at the first distal end portion and connected to a distal end of each first sub-slot.

5. The substrate of claim 4, wherein the first mid-slot extends along a transverse direction and each first sub-slot extends at a predetermined angle relative to the first mid-slot.

6. The substrate of claim 4, wherein the plurality of second slots comprises a plurality of second sub-slots and a second mid-slot, wherein the plurality of second sub-slots surrounds at least a portion of the plurality of first sub-slots, and the second mid-slot is proximate to the first mid-slot and connected to a distal end of each second sub-slot.

7. The substrate of claim 6, wherein the second mid-slot extends along a transverse direction and each second sub-slot extends at a predetermined angle relative to the second mid-slot.

8. The substrate of claim 7, wherein the predetermined angle is greater than or equal to 90 degrees.

9. The substrate of claim 1, wherein the inner flexure has a first stiffness (S1) and the outer flexure has a second stiffness (S2).

10. The substrate of claim 9, wherein the first stiffness (S1) is dependent on a geometry and a thickness of the inner flexure, and the second stiffness (S2) is dependent on a geometry and a thickness of the outer flexure such that S1 is less than S2 as measured by a degree of deflection for an applied load.

11. The substrate of claim 1, further comprising a plurality of guiding mechanism located surrounding a portion of the plurality of second slots and proximate to a second peripheral portion of the substrate, configured to support and guide the collection membrane to position beneath the outer flexure, wherein the plurality of guiding mechanism is a ridge having a protrusion.

12. A device for separating and collecting plasma, the device comprising:

a separation membrane;

a collection membrane; and a substrate, wherein the substrate comprises:

an inner flexure defined by a plurality of first slots in the substrate, disposed proximate to a first peripheral portion of the substrate; and an outer flexure defined by a plurality of second slots in the substrate, disposed surrounding at least a portion of the plurality of first slots;

wherein a distal end of the separation membrane is disposed under the outer flexure, wherein a proximal end of the collection membrane is disposed under at least one of the outer flexure and inner flexure such that the proximal end of the collection membrane has an adjacently overlapping contact area with the distal end of the separation membrane, and wherein the outer flexure is configured to apply pressure on the separation membrane and collection membrane about the adjacently overlapping contact area.

13. The device of claim 12, wherein the adjacently overlapping contact distance in the longitudinal direction is in a range from about 1 mm to about 2 mm.

14. The device of claim 12, further comprising a plurality of holding mechanism located between the first peripheral portion and a first proximal end portion of the inner flexure, configured to hold and align the separation membrane to position along the inner flexure.

15. The device of claim 12, further comprising a plurality of guiding mechanism disposed surrounding a portion of the plurality of second slots and proximate to a second peripheral portion of the substrate, configured to support and guide the collection membrane to position beneath the outer flexure, wherein the guiding mechanism is a ridge having a protrusion.

16. The device of claim 12, wherein the separation membrane and collection membrane comprise at least one of a cellulose, a glass fiber, a cellulose acetate, a polyvinyl pyrrolidone, a polysulfone, a polyethersulfone, and a polyester.

* * * * *